United States Patent [19]
Han

[11] Patent Number: 5,943,028
[45] Date of Patent: Aug. 24, 1999

[54] SELF-RASTER CIRCUIT OF A MONITOR

[75] Inventor: Choon Deok Han, Taegu, Rep. of Korea

[73] Assignee: LG Electronics Inc., Seoul, Rep. of Korea

[21] Appl. No.: 08/782,583

[22] Filed: Jan. 13, 1997

[30] Foreign Application Priority Data

Jan. 15, 1996 [KR] Rep. of Korea .......................... 96-659

[51] Int. Cl.⁶ .................................................. G09G 1/06
[52] U.S. Cl. ................................ 345/10; 345/11; 345/12; 345/13; 345/22
[58] Field of Search .................... 345/22, 10–13

[56] References Cited

U.S. PATENT DOCUMENTS

| | | | |
|---|---|---|---|
| 4,020,280 | 4/1977 | Kaneko et al. | 358/242 |
| 4,516,118 | 5/1985 | Wahlquist | 340/703 |
| 4,720,803 | 1/1988 | Ishii | 364/521 |
| 4,766,493 | 8/1988 | Kim | 358/139 |
| 5,504,521 | 4/1996 | Webb et al. | 348/180 |
| 5,670,972 | 9/1997 | Kim | 345/13 |

FOREIGN PATENT DOCUMENTS

0496580A2  7/1992  European Pat. Off. .

OTHER PUBLICATIONS

Abstract: Japio Accession No. 03/204,180 and JP 020,179,680 (NEC); Published Jul. 12, 1990.

Primary Examiner—Richard A. Hjerpe
Assistant Examiner—Henry N. Tran
Attorney, Agent, or Firm—Oppenheimer Wolff & Donnelly LLP

[57] ABSTRACT

A self-raster circuit of a monitor capable of providing color rasters to a cathode ray tube of the monitor if no video signal is inputted to the monitor from a computer. The self-raster circuit includes a detecting section for detecting whether or not a video signal is inputted to the monitor from the computer, and a control section for outputting a variety of pulse-width-modulated signals corresponding to predetermined colors to a video amplifying section of the monitor if it is detected by the detecting section that no video signal is inputted from the computer.

4 Claims, 5 Drawing Sheets

FIG. 3 (PRIOR ART)
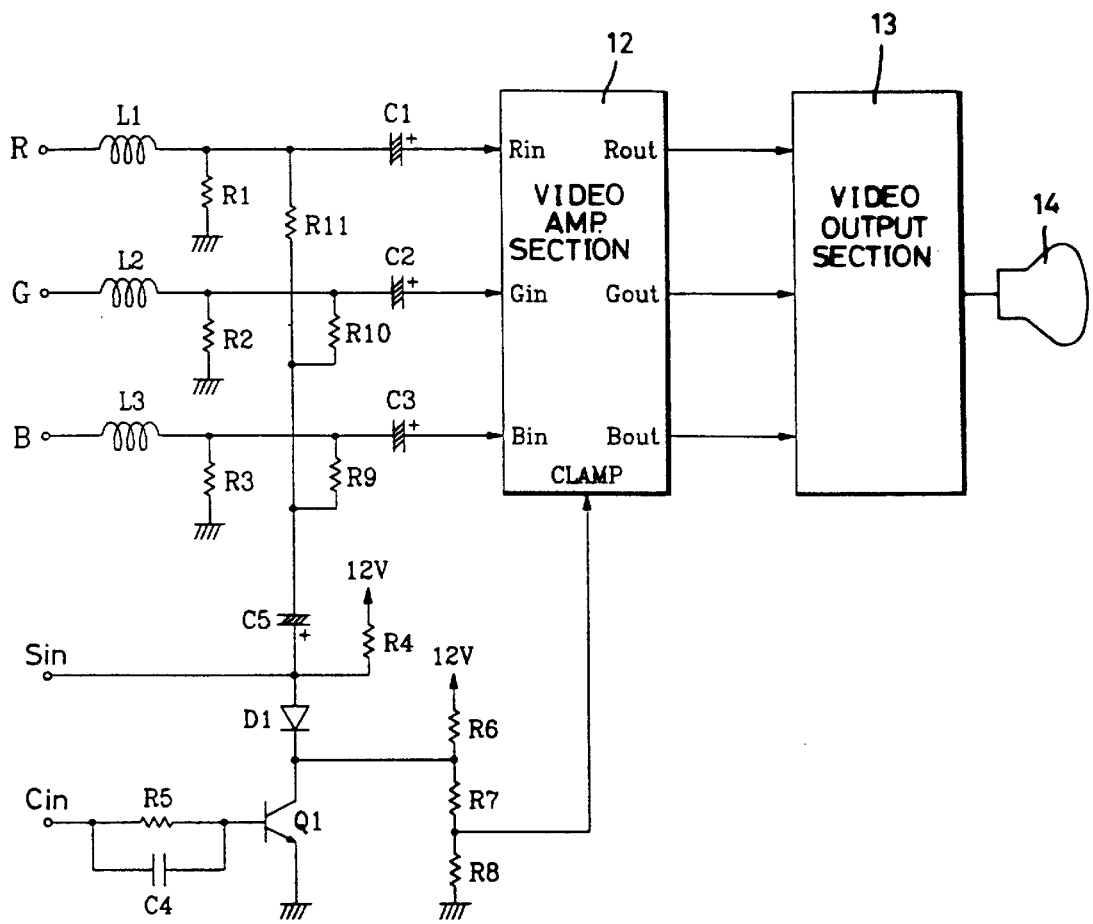
FIG. 4A
(PRIOR ART)
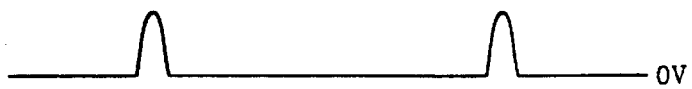
FIG. 4B
(PRIOR ART)
FIG. 4C
(PRIOR ART)
FIG. 4D
(PRIOR ART)
FIG. 4E
(PRIOR ART)
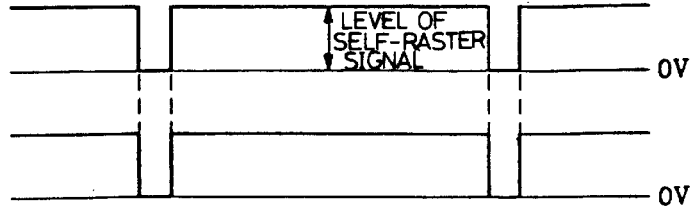

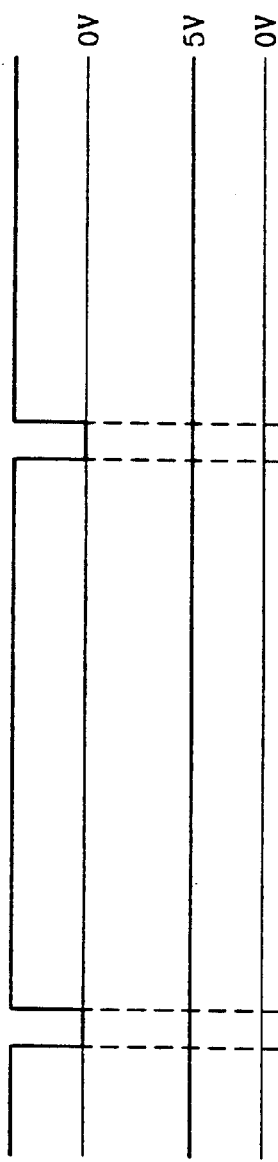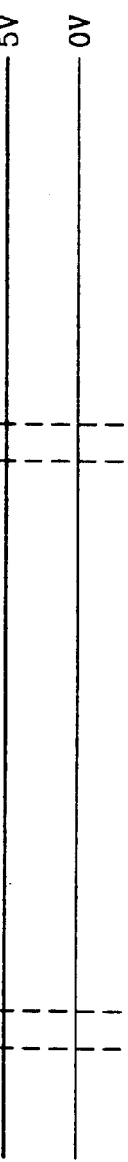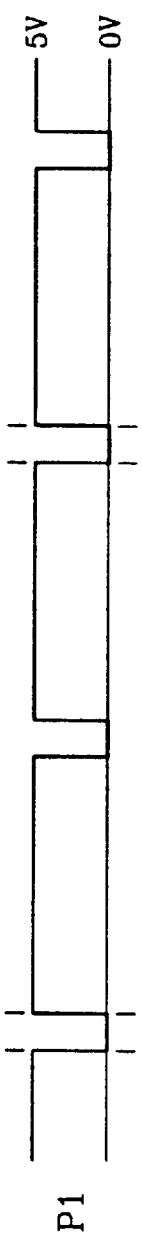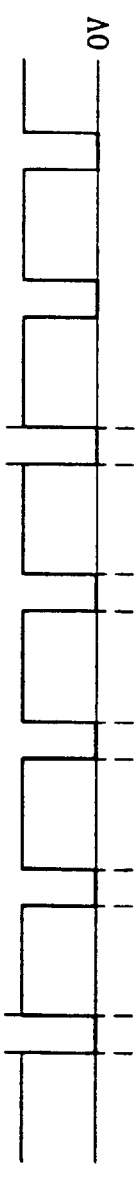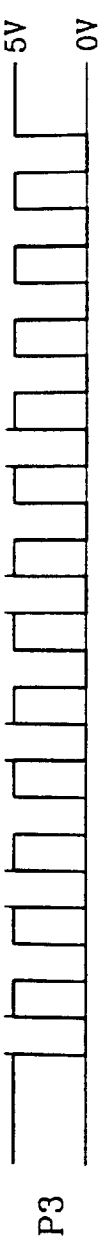
FIG. 6A CLAMP INPUT
FIG. 6B
FIG. 6C
FIG. 6D P1
FIG. 6E P2
FIG. 6F P3

SELF-RASTER CIRCUIT OF A MONITOR

BACKGROUND OF THE INVENTION

1. Field of the Invention

The present invention is related to a self-raster circuit of a monitor, particularly to a self-raster circuit of a monitor which automatically provides the monitor screen with color rasters when no video signal is inputted from a personal computer.

2. Description of the Prior Art

Rasters are scanning lines obtained by deflecting electron beams projected on a cathode ray tube (CRT) on which video signals are displayed.

FIG. 1 shows a conventional monitor 1 which is connected to a personal computer 3 by a signal cable 2. Accordingly, if the keyboard 4 connected to the computer 3 is manipulated under the power supply to the monitor 1 and computer 3, a video signal corresponding to the input key is displayed on the monitor screen.

FIG. 2 is a block diagram illustrating the construction of the conventional monitor.

Referring to FIG. 2, the conventional monitor comprises a video amplifying section 12 for amplifying a video signal inputted through a signal line 11 connected to a computer main body; a video output section 13 for processing the video signal outputted from the video amplifying section 12 to provide the processed video signal to a CRT 14; a mode controller 15 for detecting a vertical synchronizing signal V.sync and a horizontal synchronizing signal H.sync from the video signal inputted through the signal line 11 to provide a mode control signal; a vertical and horizontal output section 16 for outputting vertical and horizontal drive signals in accordance with the control signal of the mode controller 15; and a flyback transformer 17 for applying to the CRT 14 a high voltage H.V and voltages S, F for controlling the screen and focus of the CRT 14 in response to the horizontal drive signal inputted from the vertical and horizontal output section 16.

The vertical and horizontal output section 16 comprises a vertical drive output circuit 16A and a horizontal drive output circuit 16B. The reference numeral 18, of which the description has been omitted here, denotes a blanking section for outputting a control signal for adjusting the brightness of the picture in compliance to the output signal from the horizontal drive output circuit 16B, and the reference numeral 19 denotes a power supply section for providing powers of various levels required in the internal circuits of the monitor.

FIG. 3 is a schematic circuit diagram of a conventional raster circuit of a monitor in FIG. 2.

According to the conventional raster circuit shown in FIG. 3, a video amplifying section 12 amplifies video signals of R,G,B inputted from the computer by a predetermined amplification factor when the monitor is connected to the computer. The video output section 13 processes and outputs the video signals of red, green, and blue R,G,B from the video amplifying section 12 to the CRT 14 to display the video signals on the CRT 14.

Coils L1 to L3 provided at the input terminals of the video amplifying section 12 reduce the noise included in the video signals R,G,B as well as unnecessary radiation waves EMI. Resistors R1 to R3 connected to the respective output terminals in parallel adjust the impedance of the input video signals. Capacitors C1 to C3 apply only the alternating current components of the input video signals R,G,B to the video amplifying section 12.

The clamp input waveform, as shown in FIG. 4A, which is supplied from the internal oscillating circuit (not illustrated in the drawings) in the monitor through the clamp input terminal Cin, is applied to the base terminal of the transistor Q1. The clamp input waveform as shown in FIG. 4A is converted into a pulse waveform while passing through a resistor R5 and a capacitor C4, as shown in FIG. 4B. Accordingly, the waveform as shown in FIG. 4E appearing at the collector terminal of the transistor Q1 is supplied to the clamp terminal CLAMP of the video amplifying section 12.

A self-testing terminal Sin connected to the video amplifying section 12 is set to be low-leveled when no video signal is inputted into the monitor from the computer. Accordingly, the anode terminal of a diode D1 also becomes low-leveled, thereby turning off the transistor Q1. Since the direct current voltage as shown in FIG. 4C overlaps with the video signals R,G,B inputted from the computer to the video amplifying section 12, the color rasters appearing on the CRT 14 are not varied.

However, when the monitor is disconnected from the computer, and when no video signal is inputted to the monitor from the computer, the self-testing terminal Sin is set to be high-leveled. Accordingly, the clamp signal (refer to FIG. 4A) inputted to the clamp input terminal cin is converted into the clock pulse as shown in FIG. 4B while passing through the resistor R5 and capacitor C4, and inverted while passing through the transistor Q1. The waveform as shown in FIG. 4D is supplied to the anode of the diode D1 and then smoothed to be a DC voltage signal while passing through the capacitor C5, and inputted to the input terminals Rin, Gin, Bin of the video amplifying section 12 through resistors R9, R10, R11. The DC voltage signals of the same level inputted through resistors R9, R10, R11 to the input terminals Rin, Gin, Bin of the video amplifying section 12 cause monochrome rasters corresponding to the DC voltage signals to be displayed on the CRT 14.

However, the conventional self-raster circuit as described above requires a separate testing apparatus to check malfunction of the color processing of the monitor without connecting the monitor to the computer. Further, a separate apparatus is required when a user is to check malfunction of the color processing of the monitor itself. Otherwise, repair of the malfunction should rely on an after-service center.

SUMMARY OF THE INVENTION

The object of the present invention is to overcome the above drawback and to provide a self-raster circuit for a monitor which can automatically display color rasters on the monitor screen when no video signal is inputted to the monitor from the computer.

To achieve this object, the present invention provides a self-raster circuit of a monitor having a CRT, comprising:

a video amplifying section for amplifying an input video signal;

a video output section for processing and outputting the amplified video signal provided from the video amplifying section to display the video signal on a screen of the CRT;

a detecting section for detecting whether or not the video amplifying section receives the input video signal; and a control section for outputting a variety of pulse-width-modulated signals corresponding to predetermined color signals to the video amplifying section if it is detected that no video signal is inputted to the video amplifying section.

BRIEF DESCRIPTION OF THE DRAWINGS

The above object, other features and advantages of the present invention will become more apparent by describing the preferred embodiment with reference to the drawings, in which:

FIG. 3 is a schematic circuit diagram of the self-raster circuit of the conventional monitor.

FIGS. 4A to 4E are waveform diagrams appearing at various points in FIG. 3.

FIGS. 6A to 6F are waveform diagrams appearing at various points in FIG. 5.

DETAILED DESCRIPTION OF THE PREFERRED EMBODIMENT

Figure 1:
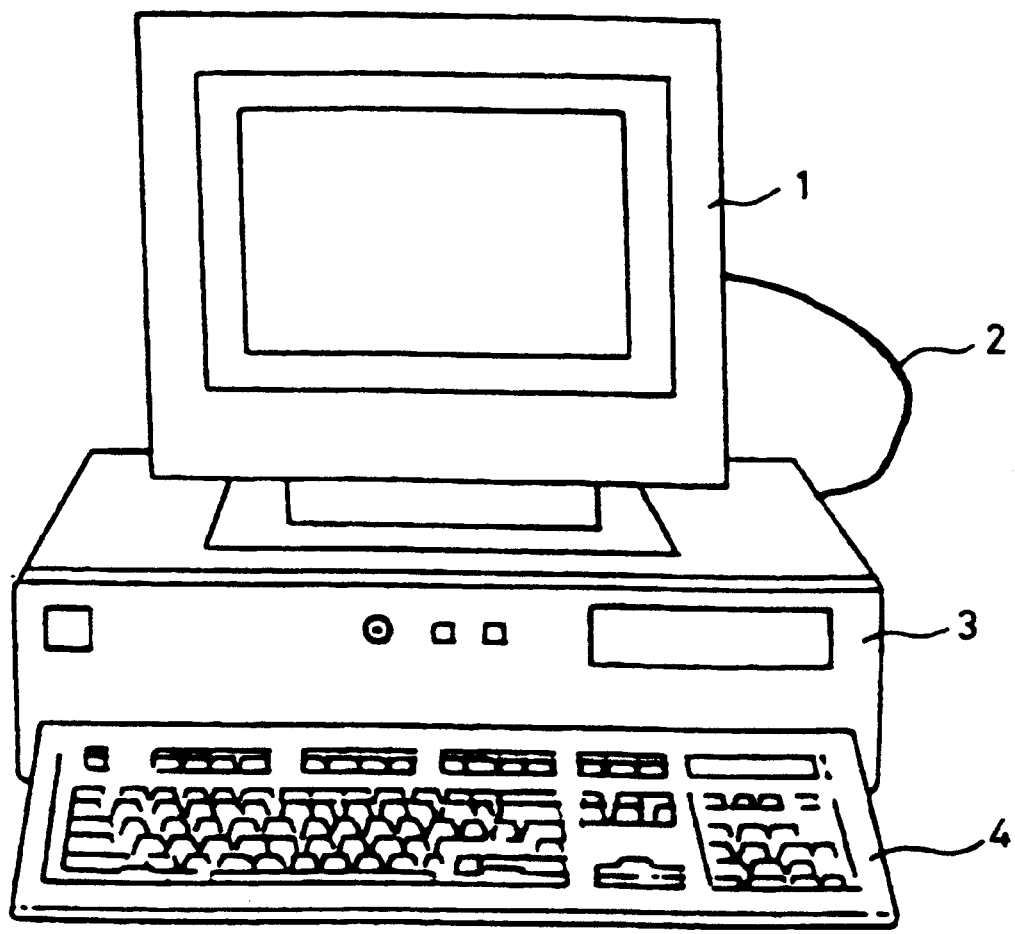
FIG. 1 is a perspective view of a conventional monitor connected to a computer main body.
Figure 2:
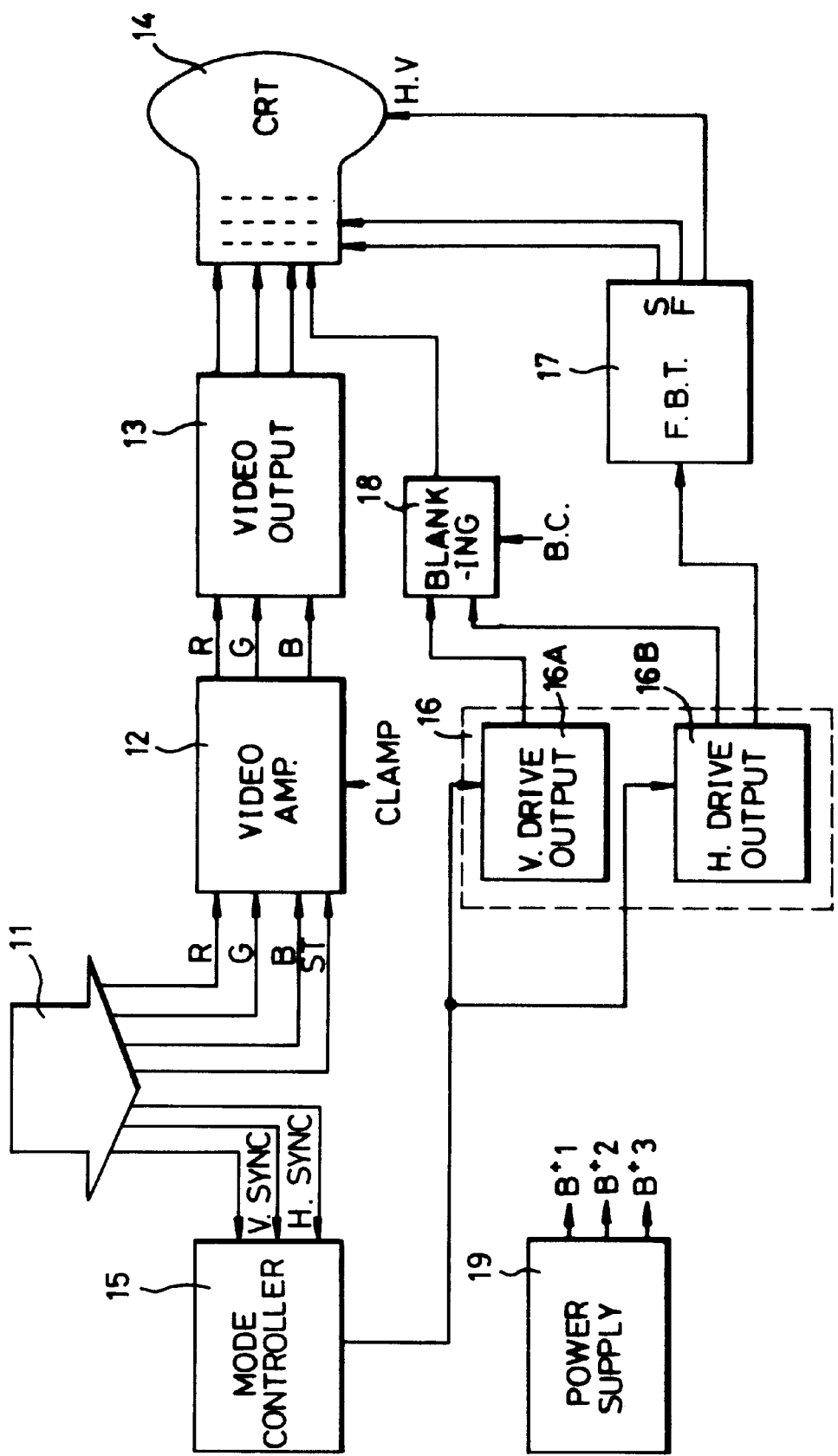
FIG. 2 is a block diagram illustrating the construction of the conventional monitor.
Figure 5:
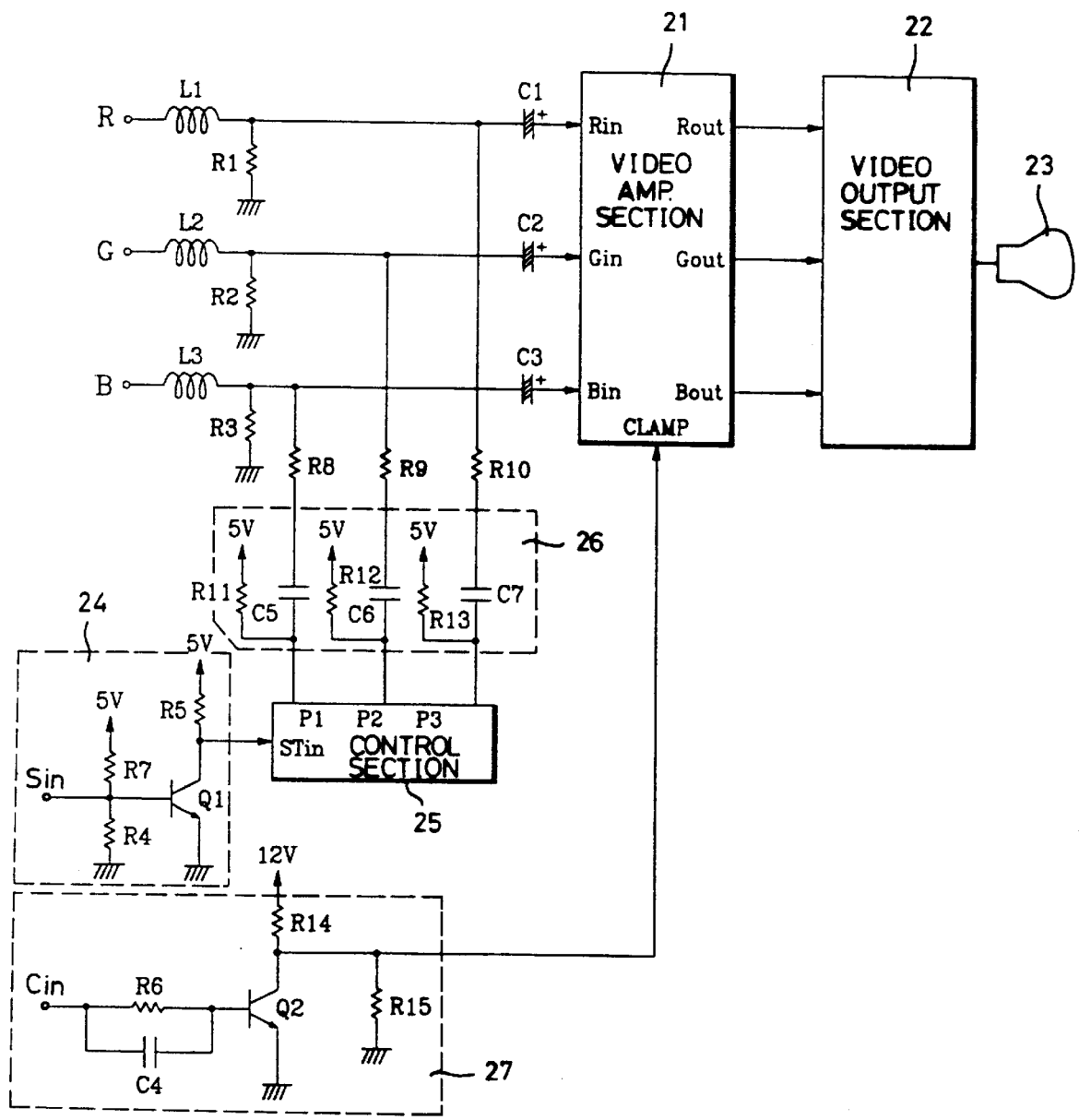
FIG. 5 is a schematic circuit diagram of the self-raster circuit of the monitor according to the present invention.

FIG. 5 is a schematic circuit diagram of the self-raster circuit of the monitor according to the present invention.

Referring to FIG. 5, the self-raster circuit according to the present invention includes a video amplifying section 21 for amplifying input video signals R,G,B provided from a personal computer, a video output section 22 for processing and outputting the video signals provided from the video amplifying section 21 to display the video signal on the screen of a CRT 23 of the monitor, a detecting section 24 for detecting whether or not the video signals are inputted to the monitor from the personal computer, a control section 25 for outputting a variety of pulse-width-modulated signals corresponding to predetermined color signals to the video amplifying section 21 when the detecting section 24 detects no input of the video signals from the personal computer to the monitor, a smoothing section 26 for smoothing at least one pulse-width-modulated signal outputted from the control section 25 to provide a DC signal to the input terminal of the video amplifying section 21, and a clamp input section 27 for generating a clamp input waveform to output the waveform to the video amplifying section 21.

The detecting section 24 is provided with resistors R4, R5, R7 and a transistor Q1, and the smoothing section 26 is provided with resistors R11 to R13 and capacitors C5 to C7. As shown in FIG. 5, capacitors C5 to C7 are arranged in series between control section 25 and video amplifying section 21. The clamp input section 27 is provided with resistors R6, R14, R15, a capacitor C4 and a transistor Q2.

The operation of the self-raster circuit of a monitor according to the present invention a constructed above will be explained in two separate occasions of when the monitor is connected to the computer and receives video signals therefrom, and when the monitor is disconnected from the computer and receives no video signal therefrom.

When the monitor is connected to the computer and receives video signals therefrom, the video signals R,G,B provided from the computer pass through coils L1, L2, L3 and resistors R1, R2, R3 and then are inputted into the video amplifying section 21 via capacitors C1, C2, C3. The input video signals are amplified by the video amplifying section 21, and then processed by the video output section 22 to be displayed on the CRT screen. At this stage, a self-testing input terminal Sin of the detecting section 24 is determined to become low (i.e., 0 V). The low level signal is applied to the base of the transistor Q1 to keep the transistor to be turned off. Accordingly, a high level signal of 5 V being supplied to the detecting section 24 is inputted to the input terminal STin of the control section 25.

The control section 25 determines that the monitor is connected to the computer if the high level signal is inputted to the input terminal Sin, and provides a predetermined DC voltage signal output terminals P1, P2, P3 to the input terminals of the amplifying section 21 through its as shown in FIG. 6C. As a result in case that the monitor is connected to the computer, the color rasters are displayed in the same manner as in the conventional circuit.

On the contrary, in case that the monitor is disconnected from the computer and no video signal is provided from the computer to the monitor, the self-testing input terminal Sin of the detecting section 24 is determined to become high, and thus the transistor Q1 is turned on, causing a low level signal is inputted to the input terminal STin of the control section 25.

If the low level signal is inputted to the input terminal STin, the control section 25 determines that the monitor is disconnected from the computer, and provides pulse-width-modulated (PWM) signals as shown in FIGS. 6D, 6E, 6F through the respective output terminals P1, P2, P3.

The PWM signals have a variety of level values, because the color rasters appearing on the CRT screen vary with the voltage levels applied to the video amplifying section 21. Accordingly, the PWM signals outputted from the output terminals P1, P2, P3 of the control section 25 are converted into DC voltage signals while passing through the smoothing circuit comprising resistors R11 to R13 and capacitors C5 to C7. The average DC voltage levels of the DC voltage signals vary with the respective pulse-widths. In other words, the average DC voltage of the video signal B levels the highest, while that of the video signal G levels second highest. The average DC voltage of the video signal R levels the lowest. Stated yet another way, $V_R<V_G<V_B$, where $V_R$, $V_G$, and $V_B$ represent the average voltage levels on the red, green and blue PWM signal inputs, respectively, to the video amplifying section.

The DC voltage signals of R,G,B inputted to the video signal input terminals Rin, Gin, Bin of the video amplifying section 21 are applied to the video output section 22. The video amplifying section 22 processes the DC voltage signals of R,G,B to display the color rasters on the screen of the CRT 23.

Irrespective of the connection of the monitor to the computer, a waveform as shown in FIG. 6A is provided from the self-oscillating circuit (not illustrated) to the clamp input terminal Cin of the clamp input section 27. This clamp input waveform is converted into a pulse waveform while passing through the resistor R6 and capacitor C4 connected in parallel. The pulse waveform causes the transistor Q2 to be turned on or off at predetermined intervals. The waveform as shown in FIG. 6B appearing on the collector of the transistor Q2 is supplied to the clamp terminal CLAMP of the video amplifying section 21.

As described above, according to the present invention, the disconnection of the monitor from the computer is automatically detected and the color rasters are displayed on the CRT by the monitor itself. Productivity accordingly increases since malfunction of the color processing of the monitor itself can be easily checked in the manufacturing process. Also, users of the monitors can easily check malfunction of the color processing of the monitor without any extra checking apparatus.

While the present invention has been described and illustrated herein with reference to the preferred embodiments thereof, it will be understood by those skilled in the art that various changes in form and details may be made therein without departing from the spirit and scope of the invention.

What is claimed is:

1. A self-raster circuit of a monitor having a cathode ray tube, comprising:

a video amplifying section for amplifying input red, green, and blue video signals;

a video output section for processing and outputting the amplified video signals provided from the video amplifying section to display the video signals on a screen of the cathode ray tube;

a detecting section for detecting whether or not the video amplifying section receives the input video signals;

a control section for outputting pulse-width-modulated signals corresponding to predetermined colors of red, green, and blue to be displayed on the screen to the video amplifying section if it is detected by the detecting section that no video signal is inputted to the video amplifying section; and a smoothing section for smoothing the pulse-width-modulated signals outputted from the control section to produce corresponding DC voltage levels to the video amplifying section.

2. A self-raster circuit of a monitor as claimed in claim 1, wherein the detecting section comprises a switching element which is turned on or off in response to voltage levels determined depending on whether or not the video signal is inputted to the video amplifying section.

3. A self-raster circuit of a monitor as claimed in claim 1, wherein said DC voltage levels of the pulse-width-modulated signals satisfy the condition of $V_R<V_G<V_B$ where $V_R$, $V_G$, and $V_B$ are average voltages representing said red, green, and blue colors to be displayed on the screen, respectively.

4. A self-raster circuit of a monitor as claimed in claim 1 wherein:

said smoothing section includes capacitors connected in series between said control section and said video amplifying section on each of said red, green, and blue video signals.

\* \* \* \* \*